United States Patent [19]
Bock et al.

[11] Patent Number: 5,212,681
[45] Date of Patent: May 18, 1993

[54] CARTRIDGE POSITIONING AND INTERLOCK APPARATUS

[75] Inventors: Steven D. Bock, Louisville; Arthur W. Klein, Broomfield; Roger A. Lopez, Lousiville; Robert J. Miosek, Berthoud; Abdul-Karim H. Kaissi, Boulder, all of Colo.

[73] Assignee: Storage Technology Corporation, Louisville, Colo.

[21] Appl. No.: 547,697

[22] Filed: Jul. 2, 1990

[51] Int. Cl.⁵ .................................... G11B 33/12
[52] U.S. Cl. ................... 369/244; 369/75.1; 360/97.01
[58] Field of Search ............ 369/75.1, 77.1, 77.2, 369/75.2, 34, 36, 292; 360/92, 97.01; 364/708, 709.10; 361/391

[56] References Cited

U.S. PATENT DOCUMENTS

| | | | |
|---|---|---|---|
| 4,754,397 | 6/1988 | Varaiya et al. | 369/34 X |
| 4,937,771 | 6/1990 | Rumps, Jr. | 369/75.1 X |
| 4,937,806 | 6/1990 | Babson et al. | 364/708 |
| 4,941,841 | 7/1990 | Darden et al. | 369/75.1 X |
| 5,010,426 | 4/1991 | Krenz | 364/708 |
| 5,045,960 | 9/1991 | Eding | 361/391 |

Primary Examiner—Robert A. Weinhardt
Attorney, Agent, or Firm—Duft, Graziano & Forest

[57] ABSTRACT

The disk drive positioning and interlock apparatus consists of a rectangular shaped frame that contains a plurality of rectangular shaped disk drive cartridge mounting openings each of which has a front side and a back side thereto, with the back side including an electrical connector for electrically interconnecting the disk drive cartridge to the backplane wiring of the disk drive housing. Each opening in the frame includes a pair of tapered channels extending from the front side of the opening to the back side and mate with a corresponding rail on the disk drive cartridge. The tapered channels provide a guide that initially has significant tolerance variation for the insertion of the disk drive cartridge and, as the disk drive cartridge is inserted further into the opening, provides a tighter conforming fit to provide precise alignment of the disk drive cartridge within the opening. The disk drive cartridge is locked into place by the use of a camming apparatus that forces the disk drive cartridge to seat in the opening.

14 Claims, 3 Drawing Sheets

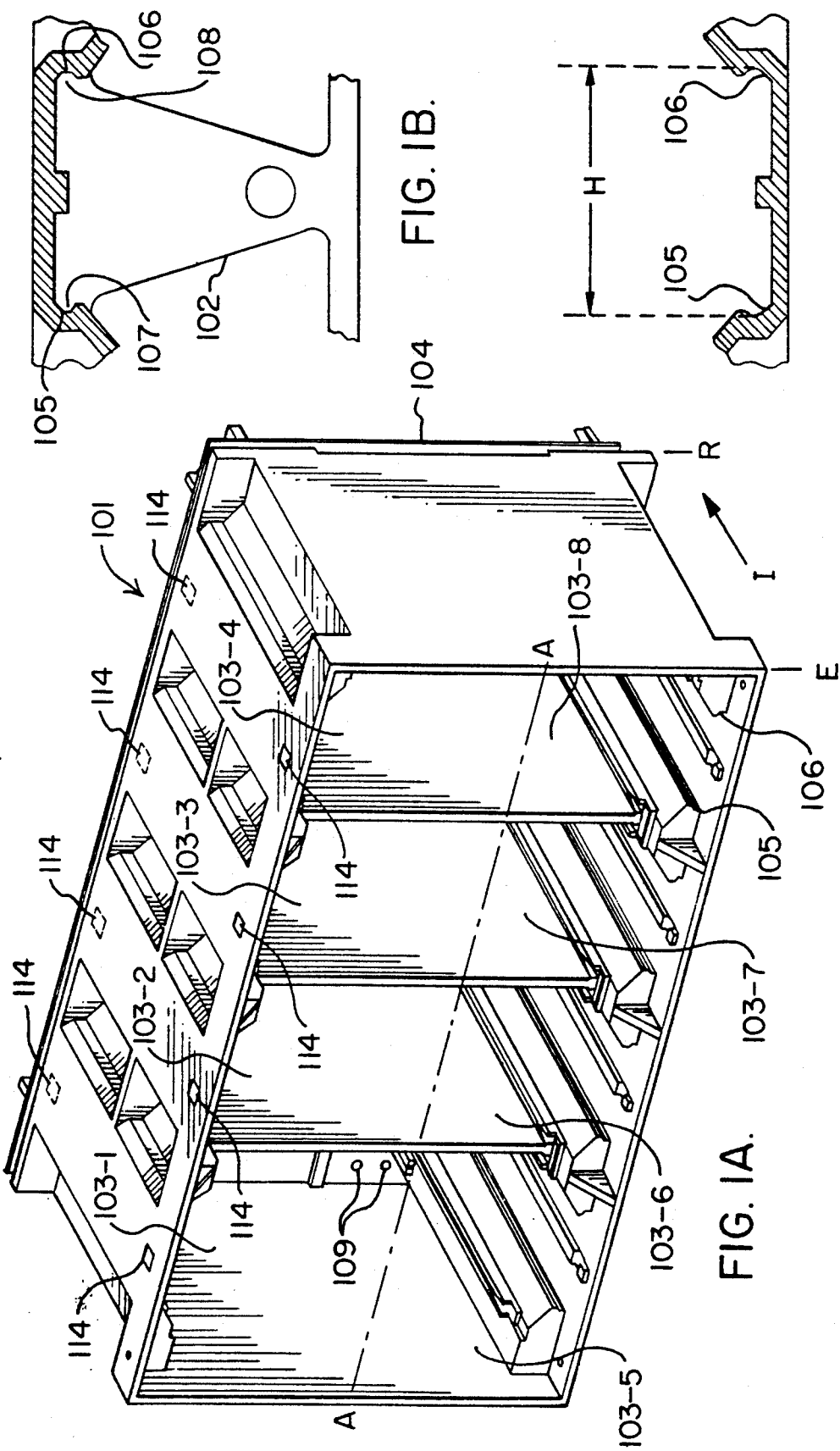

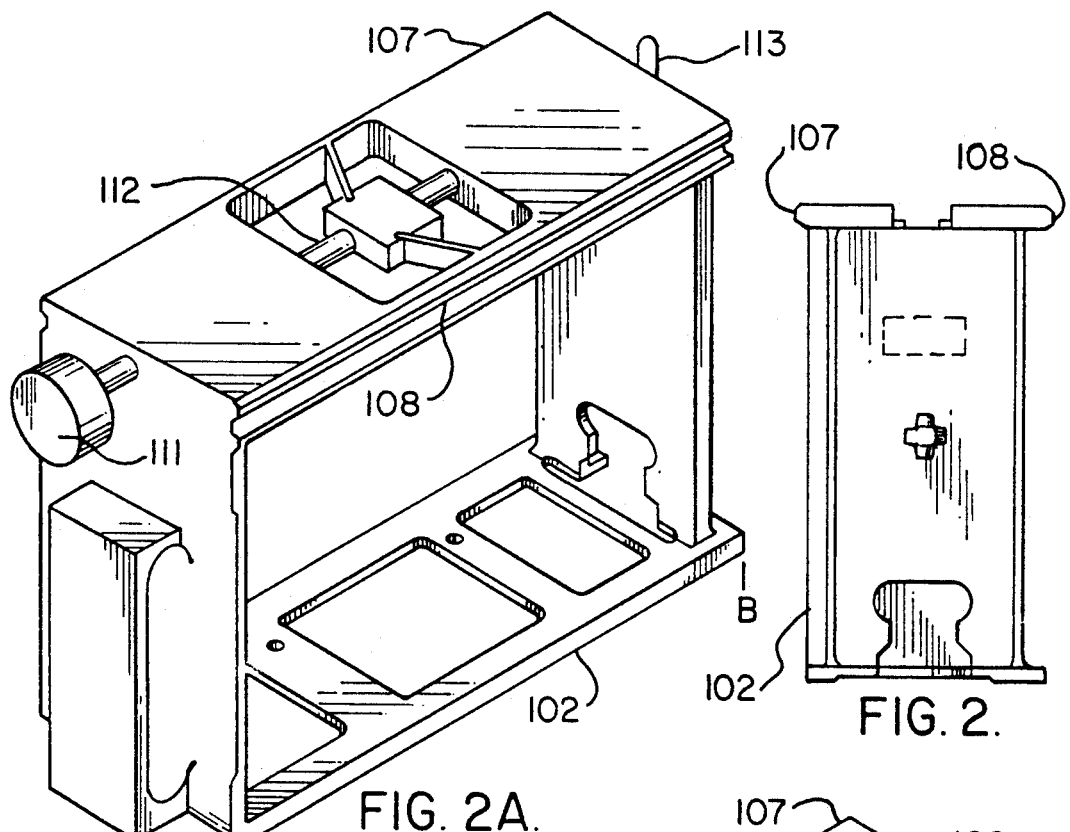
FIG. 2A.
FIG. 2.
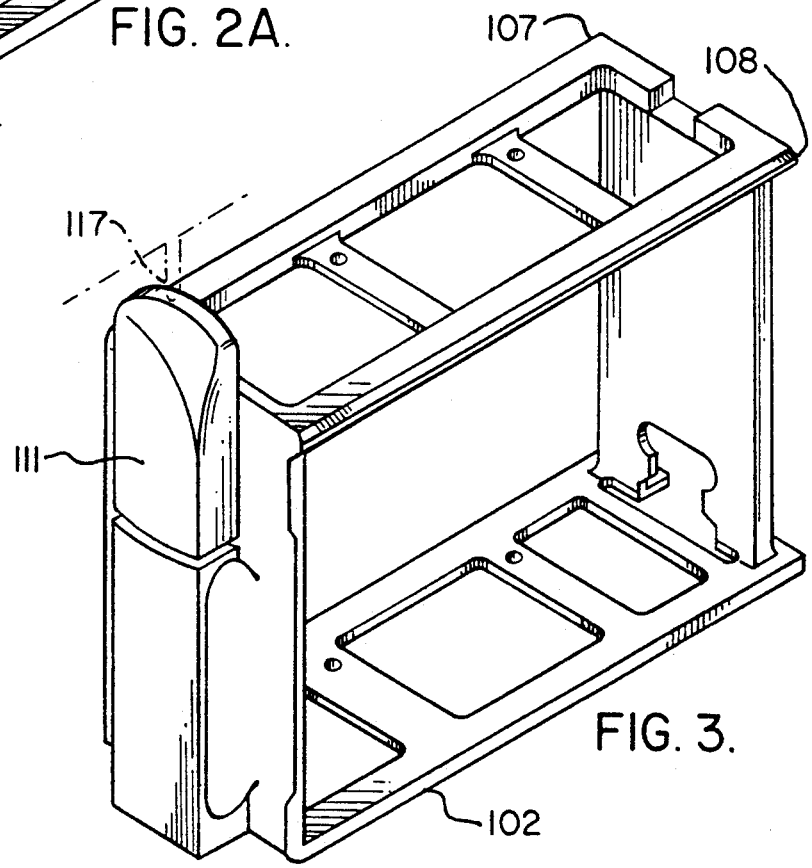
FIG. 3.

CARTRIDGE POSITIONING AND INTERLOCK APPARATUS

BACKGROUND OF THE INVENTION

This invention relates to data storage subsystems and, in particular, to apparatus for positioning and interlocking a small form factor disk drive cartridge into an opening in a data storage subsystem frame that is equipped to house a plurality of disk drive cartridges.

PROBLEM

It is a problem in the field of disk drive mounting arrangements to provide a mechanically simple, yet precisely operating disk drive cartridge mounting and positioning apparatus that enables reliable and accurate interconnection of a 5¼" form factor disk drive with a connector. The small (5¼") form factor hard disk drives are typically manufactured in a frame that is designed to be bolted into a disk drive cabinet or data storage subsystem frame. There are also numerous types of frames available to mount a plurality of 5¼" form factor disk drives into a cabinet or housing. However, all of these arrangements require bolting the individual small form factor hard disk drive to the cabinet frame or bolting the small form factor hard disk drive to a frame which is then bolted to an adjacent frame to form a stack of the disk drives. There presently is no known arrangement for conveniently mounting small form factor disk drives in a data storage subsystem frame that enables efficient installation and replacement of disk drives in the data storage subsystem frame.

SOLUTION

The above described problems are solved and a technical advance achieved in the field by the disk drive positioning and interlock apparatus that provides a simple yet precisely operating mechanism for installing small form factor disk drives in a data storage subsystem frame. This apparatus consists of a substantially rectangular shaped frame that contains a plurality of rectangular shaped disk drive cartridge mounting openings, each of which houses an associated disk drive cartridge. These openings have a front side and a back side thereto, with the back side including an electrical connector for electrically interconnecting the disk drive cartridge to the backplane wiring of the data storage subsystem frame. The disk drives themselves are mounted in a cartridge frame having a front side and a back side thereto. Each opening in the data storage subsystem frame includes a pair of tapered channels, each of which is located on opposite sides of the opening. These channels extend from the front side of the opening to the back side and mate with a corresponding rail on the disk drive cartridge frame. The tapered channels guide the insertion of the disk drive cartridge into the opening where the taper of the tapered channel provides a guide opening having diminishing width as the disk drive cartridge is inserted further into the opening. Thus, the tapered channels provide a guide that initially has significant tolerance variation for the insertion of the disk drive cartridge and, as the disk drive cartridge is inserted further into the opening, provides a tighter conforming fit to provide precise alignment of the disk drive cartridge within the opening.

The disk drive cartridge is locked into place by the use of a camming apparatus that forces the disk drive cartridge to seat in the opening. An elastomeric stop is located on the back side of the opening to provide a back pressure on the cam apparatus to prevent it from working loose due to vibration. The cam apparatus compresses the elastomeric stop during its camming action to thereby produce the reverse force.

In this configuration, the use of the tapered channel and the camming apparatus provides precise positional location of the disk drive cartridge within the opening in order to thereby align the two halves of the mating electrical connector that interconnect the disk drive cartridge with the backplane of the data storage subsystem frame. There are a number of configurations possible for each of the elements contained in this interlock apparatus and these are disclosed in further detail herein.

BRIEF DESCRIPTION OF THE DRAWING

FIG. 1A illustrates a perspective view of the data storage subsystem frame;

FIGS. 1B and 1C illustrate a detailed view of channels/rails of the data storage subsystem frame/disk drive cartridge;

FIGS. 2, 2A illustrate a perspective view of the disk drive cartridge; and

FIGS. 3-5 illustrate various embodiments of the camming apparatus.

DETAILED DESCRIPTION

Figure 4:
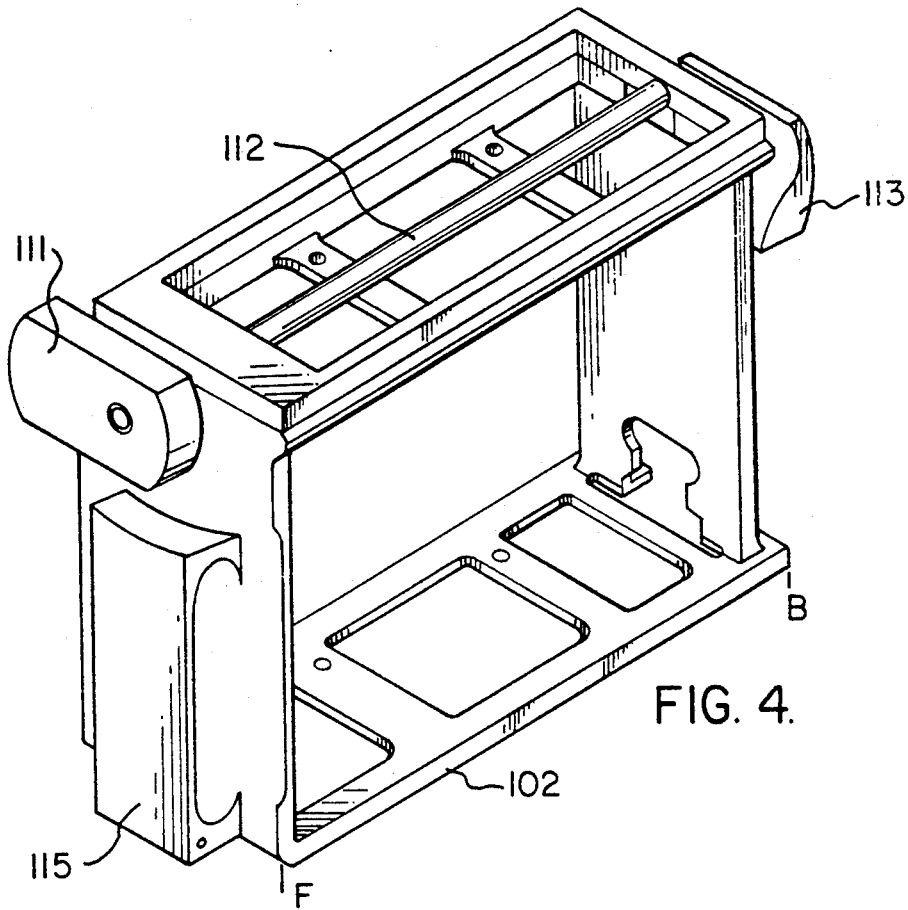

FIG. 1A illustrates a perspective view of the data storage subsystem frame 101 and FIGS. 2A, 2B illustrate a disk drive cartridge 102. This apparatus is typically used in a data storage subsystem to physically mount a plurality of small form factor disk drive cartridges. A new form of data storage subsystem consists of a parallel disk array which makes use of a plurality of small form factor disk drives to emulate the performance of a large form factor disk drive. In the parallel disk drive array, a plurality of disk drives are provided in the data storage subsystem, and these disk drives are interconnectable to form redundancy groups, each of which contains n disk drives that are used to store data thereon and m redundancy drives that store redundancy information for data reconstruction purposes. In a typical data storage subsystem, a large number of these small form factor disk drives can be used to provide economical, efficient and highly reliable data storage capacity for a host processor.

In this arrangement, a data storage subsystem frame 101 is used to provide the mechanical or physical mounting of the plurality of small form factor disk drives 102 and to provide the electrical interconnection thereof. The disk drive that is contained in disk drive cartridge 102 is electrically connected an electrical connector (not shown) located on the back (B) of disk drive cartridge 102. A mating electrical connector (not shown) is located on backplane 104 to enable the electrical interconnection of the disk drive in disk drive cartridge 102 with backplane 104. Data storage subsystem frame 101 includes a plurality of rectangular shaped disk drive cartridge mounting openings 103-1 to 103-8, each of which is used to house an associated disk drive cartridge, for example 102. Each of the openings 103 in the data storage subsystem frame 101 includes a three or four sided frame that is used to support and guide the associated disk drive cartridge 102 into an installed position wherein the back (B) of a disk drive cartridge 102 and its associated electrical connector interconnect with the electrical connector on the backplane 104 located on the back side (R) of the opening 103.

In order to accomplish the guiding and alignment function, a pair of tapered channels 105, 106 are included in each opening 103 (FIGS. 1B, 1C). Each channel 105, 106 extends from the front side (E) of the opening 103 to the back side (R) of the opening 103 and mates with a corresponding rail 107, 108 located on the disk drive cartridge 102. The channels 105, 106, in cooperatively operative relationship with the corresponding rails 107, 108 on the disk drive cartridge 102, function to precisely guide and align the disk drive cartridge 102 in opening 103 such that two halves of the electrical connector that interconnect disk drive cartridge 102 and backplane 104 are precisely aligned when disk drive cartridge 102 is fully inserted into opening 103. Data storage subsystem frame 101 is symmetric about the dotted line A—A shown in FIG. 1A so that FIG. 1B illustrates disk drive cartridge frame 102 in one of the upper openings (ex 103-4) while FIG. 1C illustrates a disk drive cartridge frame 102 in one of the lower openings (ex 103-8).

One or more elastomeric stops 109 are provided on the back side (R) of each opening 103 to elastically resist the complete insertion of disk drive cartridge 102 into opening 103. The function of elastomeric stops 109 is to provide back pressure on the camming apparatus 110 (FIG. 5) that functions to lock disk drive cartridge 102 into opening 103. Absent the resistive force provided by elastomeric stops 109, the camming apparatus 110 has a tendency to work loose due to vibration caused by the operation of the disk drive within disk drive cartridge 102 and ambient vibrations carried by the housing to the camming apparatus 110.

TAPERED CHANNELS

Tapered channels 105, 106 are used to provide a guiding mechanism to enable a craftsperson to insert disk drive cartridge 102 into opening 103 in a simple and efficient manner. Each of the tapered channels 105, 106 typically consists of a semicircular or polygonal channel (approximating a cylindrical channel), that is open on the front end (E) thereof. A craftsperson installs a disk drive cartridge 102 into opening 103 by aligning the back end (B) of the disk drive cartridge 102 with the opening 103 in data storage subsystem frame 101 such that rails 107, 108 fit into the open end of channels 105, 106. The horizontal distance (H) between channels 105 and 106 are such that they support rails 107, 108 on disk drive cartridge 102 but provide a certain amount of horizontal tolerance such that disk drive cartridge 102 can be moved laterally when the back end (B) of disk drive cartridge 102 is placed into the front side (E) of opening 103. Tapered channels 105 and 106 are tapered along their length (in direction I) such that the inside distance (H) between tapered channels 105 and 106 decreases as the length of the tapered channel is traversed in direction I from the front side (E) of opening 103 to the back side (R) of opening 103. Therefore, rails 107, 108 of disk drive cartridge 102 tightly fit in the back end of opening 103 since tapered channels 105, 106 have a smaller inside diameter between tapered channels 105 and 106 at the back end (R) of opening 103 then at the front end (E) of opening 103. The function of the tapered channels 105, 106 is to provide support for disk drive cartridge 102 in opening 103 and simultaneously provide a quickly alignable opening into which a craftsperson can insert disk drive cartridge 102. An integral handle 115 can be provided on disk drive cartridge 102 to assist the craftsperson in handling disk drive cartridge 102. The taper of tapered channels 105 and 106 performs a funneling effect where the disk drive cartridge 102 is aligned in opening 103 with greater precision as it traverses the length of tapered channels 105, 106 such that by the time the back side (B) of disk drive cartridge 102 reaches the back side (R) of opening 103, the two halves of the electrical connector contained on the respective back sides of disk drive cartridge 102 and opening 103 are aligned with significant precision. Therefore, tapered channels 105 and 106 provide both vertical and horizontal precision of alignment of disk drive cartridge 102 in opening 103.

CAMMING APPARATUS

Figure 5:
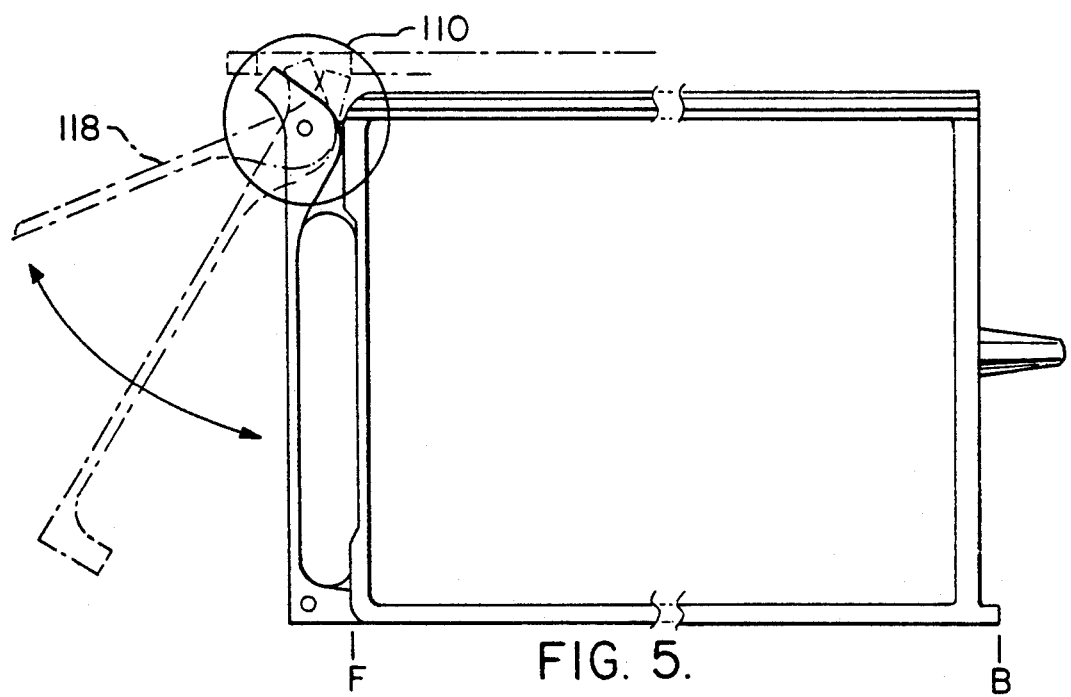

In order to quickly and efficiently secure disk drive cartridge 102 within opening 103, a camming apparatus 110 is provided to enable the craftsperson to simply mechanically lock disk drive cartridge 102 in the fully inserted position in opening 103. The camming apparatus 110 includes a number of possible embodiments (FIGS. 2–5) and basically consists of a cam mechanism to force disk drive cartridge 102 up against elastomeric stops 109 to firmly seat disk drive cartridge 102 into opening 103 such that the two halves of the electrical connector properly electrically mate. The camming apparatus 110 includes a rotatable lever 111 located on the front side of disk drive cartridge 102. This lever can include a pin 113 which, upon the rotation of lever 111, seats into a camming slot 114 located on the top side of opening 103 to thereby force disk drive cartridge 102 all the way into opening 103. Similarly, the lever 111 can be instead a slotted cam 111 that mates with a pin 117 in opening 103 (shown in FIG. 3) or even a hinged lever 118 as shown in FIG. 5. In all of these arrangements, the use of a cam 111, pin 113 or lever engagable with a corresponding slot 114 or pin 117 provides a well known camming and locking function. As shown in FIG. 4, this camming apparatus can be located at the back side of disk drive cartridge 102 and in FIG. 4 is embodied by a rotatable pin 113 connected by shaft 112 to lever 111 on the front side of disk drive cartridge 102. The positioning the locking mechanism of camming apparatus 110 on the front side (F) or the back side (B) of disk drive cartridge 102 is a matter of design choice and all of the embodiments mentioned above provide the same disk drive cartridge seating and locking function that provides precise alignment in the opening 103. Additionally, the lever 111 of camming apparatus 110 can be configured such that unless it is in a locked position it interferes with the closure of a cover (not shown) that provides an environmentally secure closure over the front side of data storage subsystem frame 101. In this manner, the craftsperson can not fail to secure the disk drive cartridge 102 into opening 103 since the cover will not close.

Therefore, it is apparent that the above described interlock apparatus enables the rapid installation or replacement of a disk drive cartridge 102 in an opening 103 without requiring the use of any tools and yet provides precise three dimensional alignment of the disk drive cartridge 102 in opening 103. The use of tapered channels 105, 106 provides two dimensions of precision alignment while the use of a camming mechanism 110 provides the third dimension precision and at the same time provides a lock mechanism to prevent the movement of the disk drive cartridge 102 once it is installed in opening 103. A simple connector configuration can be employed in this arrangement since no connector interlock or bolting mechanism is required to securely electrically interconnect the two halves of the associated electrical connector. An additional benefit of this apparatus is that the disk drive cartridges 102 can be inserted in either a vertical or inverted vertical position as shown by the two rows of disk drive cartridges openings 103 in FIG. 1. Thus, the apparatus shown in FIG. 1 is symmetric about a horizontal line A—A drawn through the middle of the data storage subsystem frame 101. Such symmetry provides simplicity of manufacture and ease of installation since there is no "correct" top and bottom side of housing 101. The data storage subsystem frame 101 can be manufactured inexpensively by the use of structural foam such as Lexan FL-900 or Nordel FN-215 which provide the required structural strength and rigidity yet provide inexpensive manufacturability through the use of injection molding of structural foam.

While a specific embodiment of this invention has been disclosed, it is expected that those skilled in the art can and will design alternate embodiments of this invention that fall within the scope of the appended claims.

We claim:

1. In a disk drive housing, having a plurality of rectangular-shaped disk drive cartridge mounting openings for housing an associated disk drive cartridge, each of said openings having a front, a back wall, a top wall and two side walls which define said opening, a disk drive interlock apparatus for mechanically securing a disk drive cartridge, having a front side and a back side, into one of said disk drive cartridge mounting openings, comprising:

a pair of tapered channel means, located on said top wall of said opening, extending from said front to said back wall and mating with a corresponding rail on said disk drive cartridge, for guiding the insertion of said disk drive cartridge into said opening, wherein the taper of said tapered channel means provides a guide opening having diminishing width from said front to said back wall;

elastomeric stop means located on said back wall of said opening for elastically resisting the complete insertion of said corresponding disk drive cartridge into said opening; and camming means for compressing said elastomeric stop means to lock said corresponding disk drive cartridge into said opening.

2. The apparatus of claim 1 wherein said camming means includes:

slotted cam means rotatably mounted on said disk drive cartridge for engagably interconnecting with a pin on said top wall of said opening to force said disk drive cartridge into said opening.

3. The apparatus of claim 2 wherein said slotted cam means is located on the front of said disk drive cartridge and said pin is mounted on said top wall of said opening.

4. The apparatus of claim 2 wherein said slotted cam means is located on the back of said disk drive cartridge and said pin is mounted on the back wall of said opening.

5. The apparatus of claim 1 wherein said camming means includes:

pin means rotatably mounted on said disk drive cartridge for engagably interconnecting with a slot on said top wall of said opening to force said disk drive cartridge into said opening.

6. The apparatus of claim 5 wherein said pin means is located on the front of said disk drive cartridge and said slot is mounted on said top wall of said opening.

7. The apparatus of claim 5 wherein said pin means is located on the back of said disk drive cartridge and said slot is mounted on the back wall of said opening.

8. The apparatus of claim 1 wherein said camming means includes:

lever means rotatably mounted on said disk drive cartridge and including a pin extending therefrom for engagably interconnecting with a slot on said top wall of said opening to force said disk drive cartridge into said opening.

9. The apparatus of claim 8 wherein said pin is located on the front of said disk drive cartridge and said slot is mounted on said top wall of said opening.

10. The apparatus of claim 8 wherein said pin is located on the back of said disk drive cartridge and said slot is mounted on the back wall of said opening.

11. The apparatus of claim 1 wherein said channel means is a semicircular shaped channel.

12. The apparatus of claim 1 wherein said channel means is a polygonal channel that piecewise approximates a semicircular shaped channel.

13. The apparatus of claim 1 further including:

connector means, located on said back wall of said opening, for electrical interconnection to a corresponding mating electrical connector on said disk drive cartridge.

14. In a disk drive housing, having a plurality of rectangular-shaped disk drive cartridge mounting openings for housing an associated disk drive cartridge, each of said openings having a front, a back wall, a top wall and two side walls which define said opening, a disk drive interlock apparatus for mechanically securing a disk drive cartridge, having a front side and a back side, into one of said disk drive cartridge mounting openings, comprising:

a pair of tapered channel means, each located on said top wall of said opening, extending from said front to said back wall and mating with a corresponding rail on said disk drive cartridge and including a polygonal channel that piecewise approximates a semicircular shaped channel, for guiding the insertion of said disk drive cartridge into said opening, wherein the taper of said tapered channel means provides a guide opening having diminishing width from said front to said back wall of said opening;

elastomeric stop means located on said back wall of said opening for elastically resisting the complete insertion of said corresponding disk drive cartridge into said opening;

camming means for compressing said elastomeric stop means to lock said corresponding disk drive cartridge into said opening, including:

pin means rotatably mounted on said disk drive cartridge for engagably interconnecting with a slot on said top wall of said opening to force said disk drive cartridge into said opening;

lever means rotatably mounted on said disk drive cartridge and connected to said pin means for rotating said pin means into said slot.

* * * * *